US009683373B2

(12) United States Patent
Helms et al.

(10) Patent No.: US 9,683,373 B2
(45) Date of Patent: Jun. 20, 2017

(54) COMPOSITE CLADDING PANEL BUILDING SYSTEM

(71) Applicant: GOLDEN HOMES HOLDINGS LIMITED, Hamilton (NZ)

(72) Inventors: Lennard Trevor Helms, Hamilton (NZ); Thomas Rex Collins, Hamilton (NZ)

(73) Assignee: Golden Homes Holdings Limited, Hamilton (NZ)

( * ) Notice: Subject to any disclaimer, the term of this patent is extended or adjusted under 35 U.S.C. 154(b) by 0 days.

(21) Appl. No.: 14/651,759

(22) PCT Filed: Dec. 11, 2013

(86) PCT No.: PCT/NZ2013/000227
§ 371 (c)(1),
(2) Date: Jun. 12, 2015

(87) PCT Pub. No.: WO2014/098615
PCT Pub. Date: Jun. 26, 2014

(65) Prior Publication Data
US 2015/0308125 A1    Oct. 29, 2015

(30) Foreign Application Priority Data
Dec. 17, 2012  (NZ) ........................................ 604761

(51) Int. Cl.
*E04F 13/08* (2006.01)
*E04F 13/12* (2006.01)
(Continued)

(52) U.S. Cl.
CPC ............. *E04F 13/0866* (2013.01); *B32B 7/12* (2013.01); *B32B 15/046* (2013.01); *B32B 15/20* (2013.01);
(Continued)

(58) Field of Classification Search
CPC .............. E04F 13/0866; E04F 13/0832; E04F 13/0891; E04F 13/12; E04F 19/061;
(Continued)

(56) References Cited

U.S. PATENT DOCUMENTS 2,277,791 A * 3/1942 Small ...................... E04C 2/292
52/302.3
2,955,686 A * 10/1960 Blomeley .............. B65D 90/06
52/246

(Continued)

FOREIGN PATENT DOCUMENTS

CN         202627413      12/2012
EP         2292426 A1 *   3/2011   ............. B32B 5/022
(Continued)

*Primary Examiner* — Jeanette E Chapman
(74) *Attorney, Agent, or Firm* — Greer, Burns and Crain, Ltd.

(57) ABSTRACT

A composite cladding panel building system includes composite cladding panels, each panel having an interior layer made of an insulating material which is enclosed by an exterior layer made of a waterproof material; at least one support extrusion configured to be fixed to a supporting structure via at least one fixing surface and support an interior side of the composite cladding panel; and at least one corner extrusion configured to attach to the supporting structure in a gap formed between the exterior edges of two adjacent like composite cladding panels via a fixing extrusion attached to the supporting structure and to overlap the exterior edge of the adjacent panels to seal the gap.

14 Claims, 13 Drawing Sheets

(51) Int. Cl.

| | | |
|---|---|---|
| *E04F 19/06* | (2006.01) | |
| *B32B 7/12* | (2006.01) | |
| *B32B 15/04* | (2006.01) | |
| *B32B 15/20* | (2006.01) | |
| *B32B 37/10* | (2006.01) | |
| *B32B 37/18* | (2006.01) | |
| *E04C 2/292* | (2006.01) | |
| *E04B 2/00* | (2006.01) | |
| *E04F 13/00* | (2006.01) | |

(52) U.S. Cl.
CPC .............. *B32B 37/10* (2013.01); *B32B 37/18* (2013.01); *E04C 2/292* (2013.01); *E04C 2/46* (2013.01); *E04F 13/007* (2013.01); *E04F 13/0821* (2013.01); *E04F 13/0832* (2013.01); *E04F 13/0875* (2013.01); *E04F 13/12* (2013.01); *E04F 19/061* (2013.01); *E04F 19/064* (2013.01); *B32B 2266/0214* (2013.01); *B32B 2266/08* (2013.01); *B32B 2307/304* (2013.01); *B32B 2307/7265* (2013.01); *B32B 2419/00* (2013.01)

(58) Field of Classification Search
CPC . E04F 19/064; E04F 13/0817; E04F 13/0875; E04F 13/0828; E04C 2/292; E04C 2/46; B32B 15/046; B32B 7/12; B32B 15/20; B32B 37/10; B32B 37/18; B32B 2266/0214; B32B 2307/7265; B32B 2419/00; B32B 2266/08
See application file for complete search history.

(56) References Cited

U.S. PATENT DOCUMENTS

| | | | |
|---|---|---|---|
| 3,274,739 | A | 9/1966 | Gregoire |
| 4,189,885 | A | 2/1980 | Fritz |
| 4,506,482 | A * | 3/1985 | Pracht ................. E04B 2/88 52/235 |
| 4,783,941 | A * | 11/1988 | Loper ................. E04C 2/384 52/235 |
| 6,035,598 | A | 3/2000 | Sukolics et al. |
| 6,341,458 | B1 | 1/2002 | Burt |
| 6,901,713 | B2 * | 6/2005 | Axsom ................. E04B 1/80 52/309.17 |
| 7,752,818 | B1 * | 7/2010 | Roegge ............... E04F 13/0814 52/235 |
| 2004/0134143 | A1 * | 7/2004 | Boyer ................. E04C 2/292 52/235 |
| 2008/0163586 | A1 | 7/2008 | Goulet et al. |
| 2010/0064611 | A1 | 3/2010 | Holt et al. |
| 2011/0202876 | A1 | 8/2011 | Badger et al. |
| 2013/0055669 | A1 | 3/2013 | Olszewski et al. |

FOREIGN PATENT DOCUMENTS

| | | | | |
|---|---|---|---|---|
| GB | | 2363404 A * | 12/2001 | ............... E04C 2/28 |
| GB | | 2520262 A * | 5/2015 | ......... E04B 1/34336 |
| JP | | 09-032265 | 2/1997 | |
| WO | WO 8900265 A1 * | | 1/1989 | ............ B32B 37/00 |
| WO | | 00/29688 | 5/2000 | |

* cited by examiner

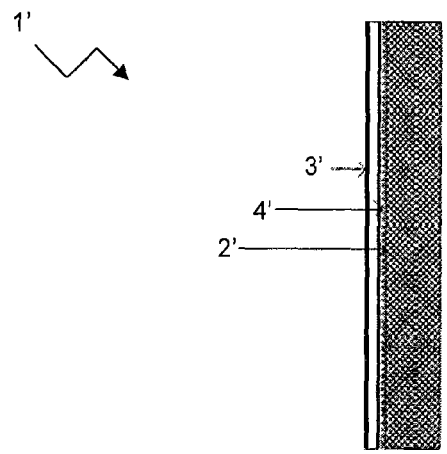
Fig. 1a
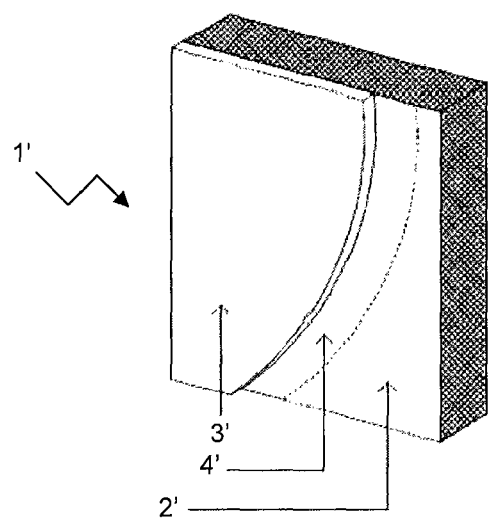
Fig. 1b
Figures 1a and 1b

COMPOSITE CLADDING PANEL BUILDING SYSTEM

STATEMENT OF CORRESPONDING APPLICATIONS

The present invention is based on the provisional specification filed in relation to New Zealand Patent Application Number 604761, the entire contents of which are incorporated herein.

TECHNICAL FIELD

The present invention relates generally to a composite cladding panel building system. In particular, the present invention relates to a composite cladding panel building system with prefabricated cladding panels for attachment to a building frame.

BACKGROUND

Buildings comprising a wooden or steel frame on which pre-formed cladding panels (such as aluminium panels) are mounted to form a non-load bearing exterior facade are known. Such buildings can be erected quickly and more cheaply than brick or block facade buildings.

The method of building with such panels involves taking measurements of each required panel from the building frame onsite and the required sized panel cut offsite with specialist cutting equipment before fitting the panel back onsite. This process may need to be repeated until all the required panels are installed. The disadvantages with such building methods are that they are time consuming, labour intensive and costly.

In addition, the current method of building with pre-formed cladding panels fitted to a building frame involves weather sealing the panels with silicone or such like. The disadvantage of this is that the silicone can break down after a period of time (such as 10 years) which then requires the panels to be resealed periodically, which can be inconvenient in terms of time and cost.

OBJECT

It is an object of the invention to provide a composite cladding panel system that addresses at least some of the problems of the prior art, such as those discussed above. Alternatively, it is an object of the invention to at least provide the public with a useful choice.

SUMMARY

According to one aspect of the present invention there is provided a composite cladding panel building system comprising:
  a cavity batten which in use is secured to a building frame;
  a composite cladding panel comprising:
    an exterior layer made of a waterproof material; and
    an interior layer made of an insulating material; and
  at least one support extrusion configured to be fixed to the cavity batten via at least one fixed surface;
  wherein said cavity batten provides a cavity between said panel and said building frame.

Preferably, the interior layer is made from closed cell foam.

More preferably, the closed cell foam is extruded polystyrene foam.

Preferably, the exterior layer is metal sheet.

More preferably, the metal sheet is aluminum.

Preferably, the exterior layer is between 1 mm to 4 mm in thickness.

More preferably, the exterior layer is 3 mm in thickness.

Preferably, the exterior layer is fixed to the interior layer via double sided tape.

Preferably, the corner joint is selected from the group consisting of: a 90° interior corner joint; a 135° interior corner joint; a 90° exterior corner joint; and a 135° exterior corner joint.

Preferably, the composite cladding panel system also comprises at least one soffit extrusion configured to locate a top edge of the composite cladding panel relative to a soffit of a building roof.

Preferably, the composite cladding panel system also comprises at least one base extrusion configured to locate a bottom edge of the composite cladding panel relative to a base surface of a building.

Preferably, the composite cladding panel system also comprises at least one sill extrusion configured to locate a top edge of the composite cladding panel relative to a window sill of a building roof.

Preferably, the composite cladding panel system also comprises at least one head extrusion configured to locate a bottom edge of the composite cladding panel relative to a window or door head of a building.

According to a second aspect of the present invention, there is provided a method for manufacturing a composite cladding panel for a composite cladding panel system comprising the method steps of:
  a. pressing an exterior layer made of a waterproof material onto a side of an interior layer made of an insulating material.

Preferably, the method for manufacturing a composite cladding panel also comprises the step:
  b. fixing the exterior layer to the interior layer using double sided tape.

Preferably, the method for manufacturing a composite cladding panel also comprises the step:
  b. vacuum sealing the exterior layer to the interior layer.

According to a third aspect of the present invention, there is provided a kit of parts for cladding the exterior of a building, the kit of parts comprising:
  a composite cladding panel comprising:
    an exterior layer made of a waterproof material; and
    an interior layer made of an insulating material;
  at least one support extrusion configured to be fixed to a supporting structure via at least one fixing surface.

BRIEF DESCRIPTION OF THE DRAWINGS

The invention will now be described by way of example only and with reference to any one of the accompanying drawings in which:

FIG. 1a shows a side view of a preferred embodiment of a composite cladding panel for use with the composite cladding panel system of the present invention;

FIG. 1b shows a sectional perspective view of the preferred embodiment shown in FIG. 1a;

DETAILED DESCRIPTION

Composite Cladding Panel

In a first preferred form of the present invention, a composite cladding panel for a building system is generally indicated by arrow 1'. The panel (1') comprises an exterior layer made of an aluminium sheet (2') which is 3 mm in thickness and which enclose an interior layer (3'), which is 12 mm in thickness and is made of an insulating material in the form of extruded polystyrene closed cell foam.

The exterior surface of the aluminium sheet (2') is powder coated during manufacture so that no finishing is needed after attachment to a wall of a building. The panel (1') can be manufactured in different dimensions as needed (such as 0.9 m by 1.1 m).

The composite cladding panel (1') is manufactured by a first step of pressing the aluminium sheet (2') onto the insulating material (3'). The aluminium sheet (2') is bonded onto the insulating material (3') via double sided tape (4').

Figure 2:
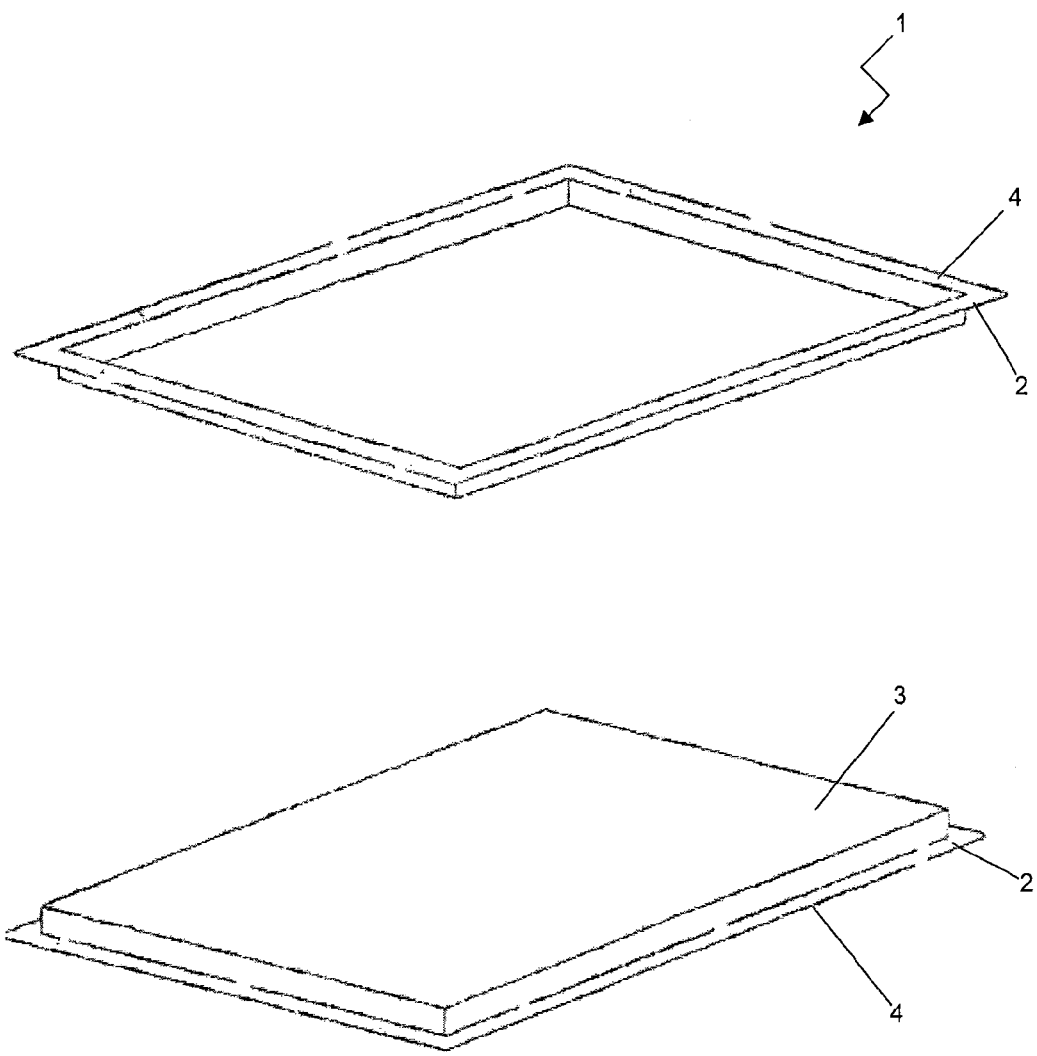
FIG. 2 shows a perspective view of a second preferred embodiment of a composite cladding panel for use with the composite cladding panel system of the present invention.

Referring to FIG. 2, in a preferred second preferred form of the invention, a composite cladding panel for a cladding panel system is generally indicated by arrow 1. The panel (1) comprises an exterior layer made of an aluminium sheet (2) which is 1 mm in thickness and which enclose an interior layer (3) made of an insulating material in the form of extruded polystyrene closed cell foam.

The exterior surface of the aluminium sheets (2) is powder coated during manufacture so that no finishing is needed after attachment to a wall of a building. The panels (1) can be manufactured in different dimensions as needed (such as 0.9 m by 1.1 m).

The composite cladding panel (1) is manufactured by a first step of pressing an exterior layer in the form of an aluminium sheet (2) onto a side of an interior layer in the form of an insulating foam core (3) and either fixing the aluminium sheet (2) to the insulating foam core (3) using double sided tape or vacuum sealing the aluminium sheet (2) to the insulating foam core (3).

Composite Cladding Panel System

The composite cladding panel system of the present invention provides for an integrated system (comprising panels, flashings and mouldings) for cladding a building in a shortened time period (such as 3 days for a medium sized residential house). The composite cladding panel system can be provided in kitset form which can be installed on site.

Figure 3:
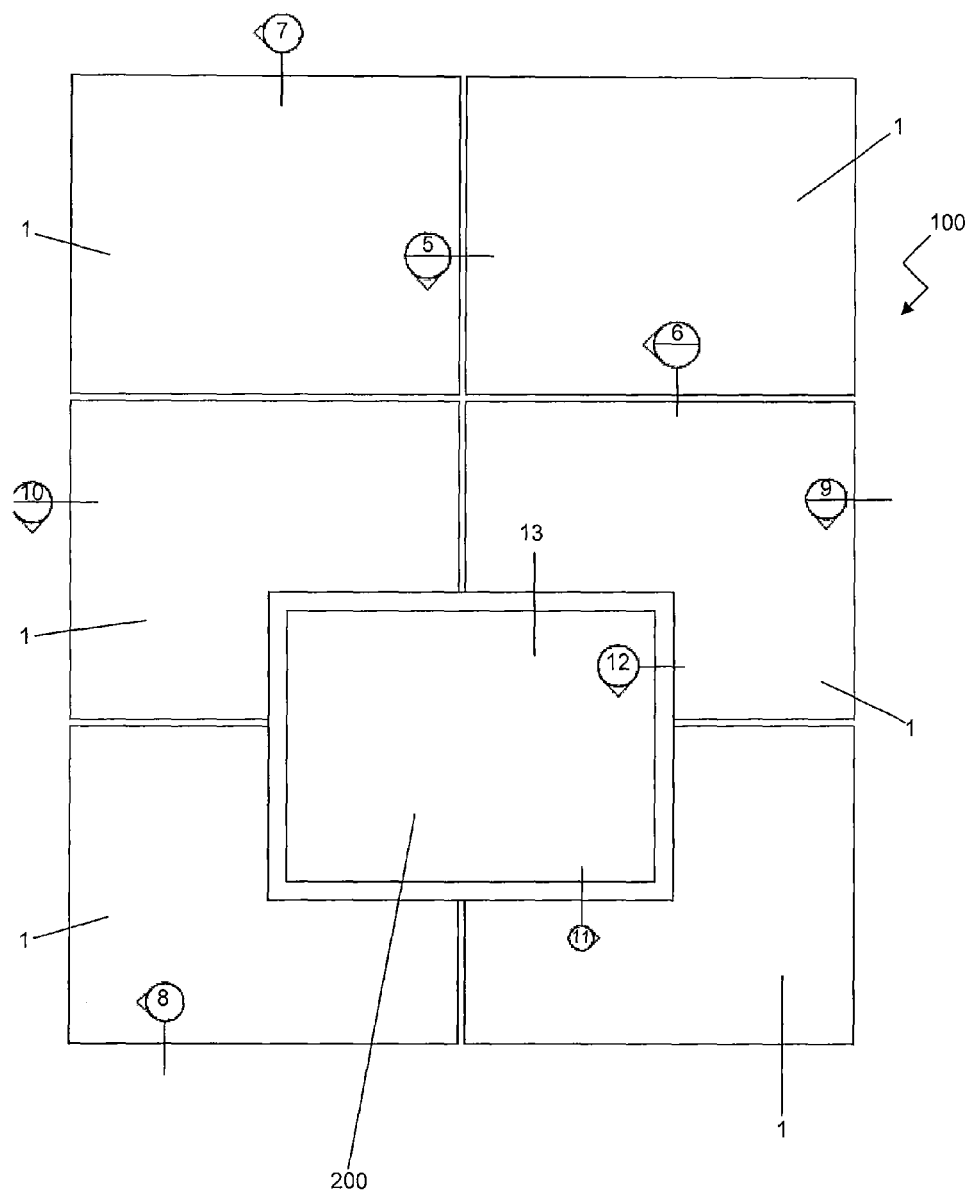
FIG. 3 shows front view of a building with a plurality of composite cladding panels as shown in FIG. 1a built with the composite cladding panel system of the present invention.
Figure 4:
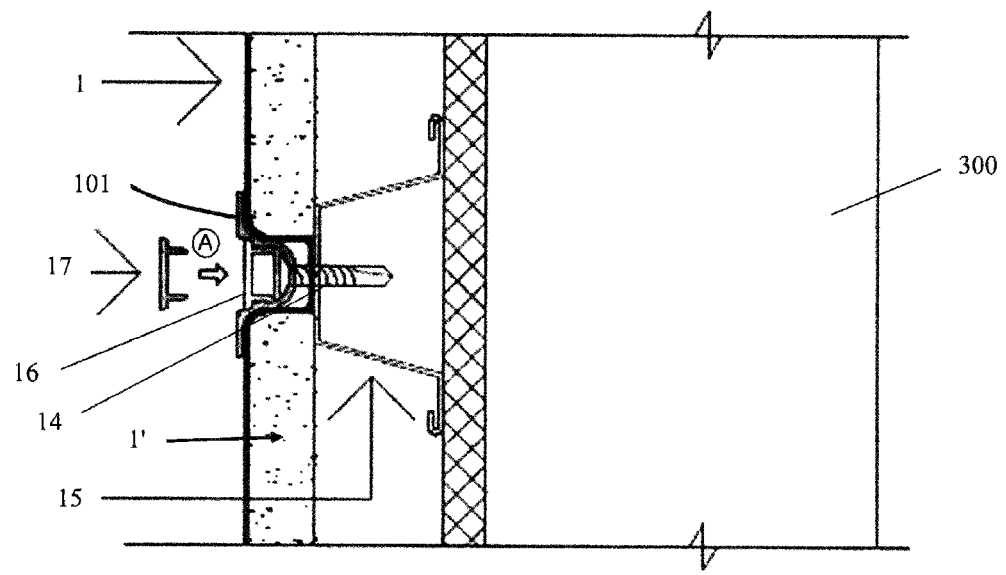
FIG. 4 shows a sectional view of a horizontal and vertical join of the building shown in FIG. 3.
Figure 5:
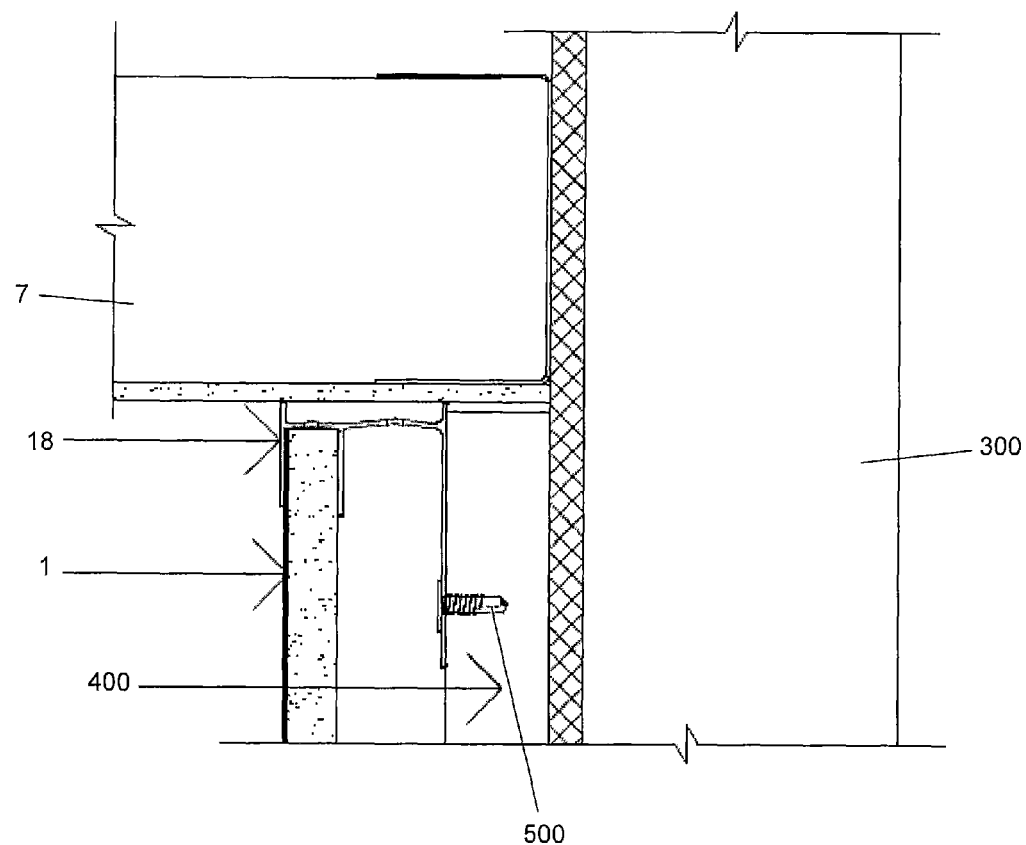
FIG. 5 shows a sectional view of the soffit of the building shown in FIG. 3.
Figure 6:
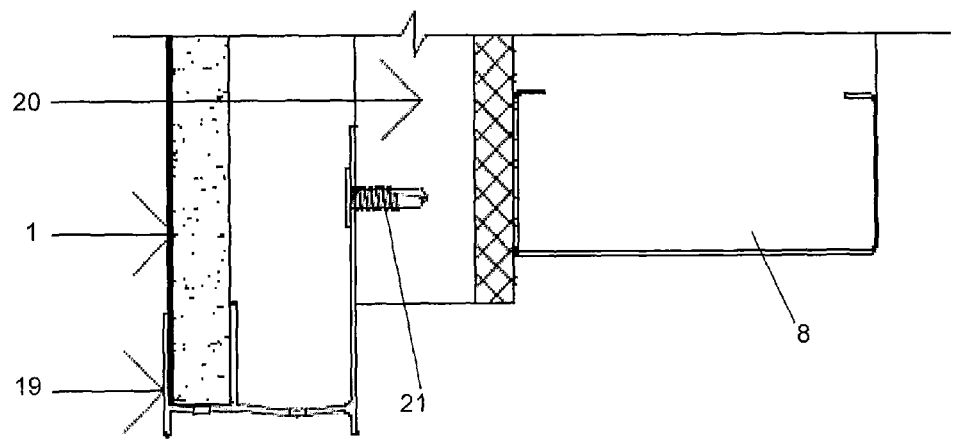
FIG. 6 shows a sectional view of the base of the building shown in FIG. 3.
Figure 7:
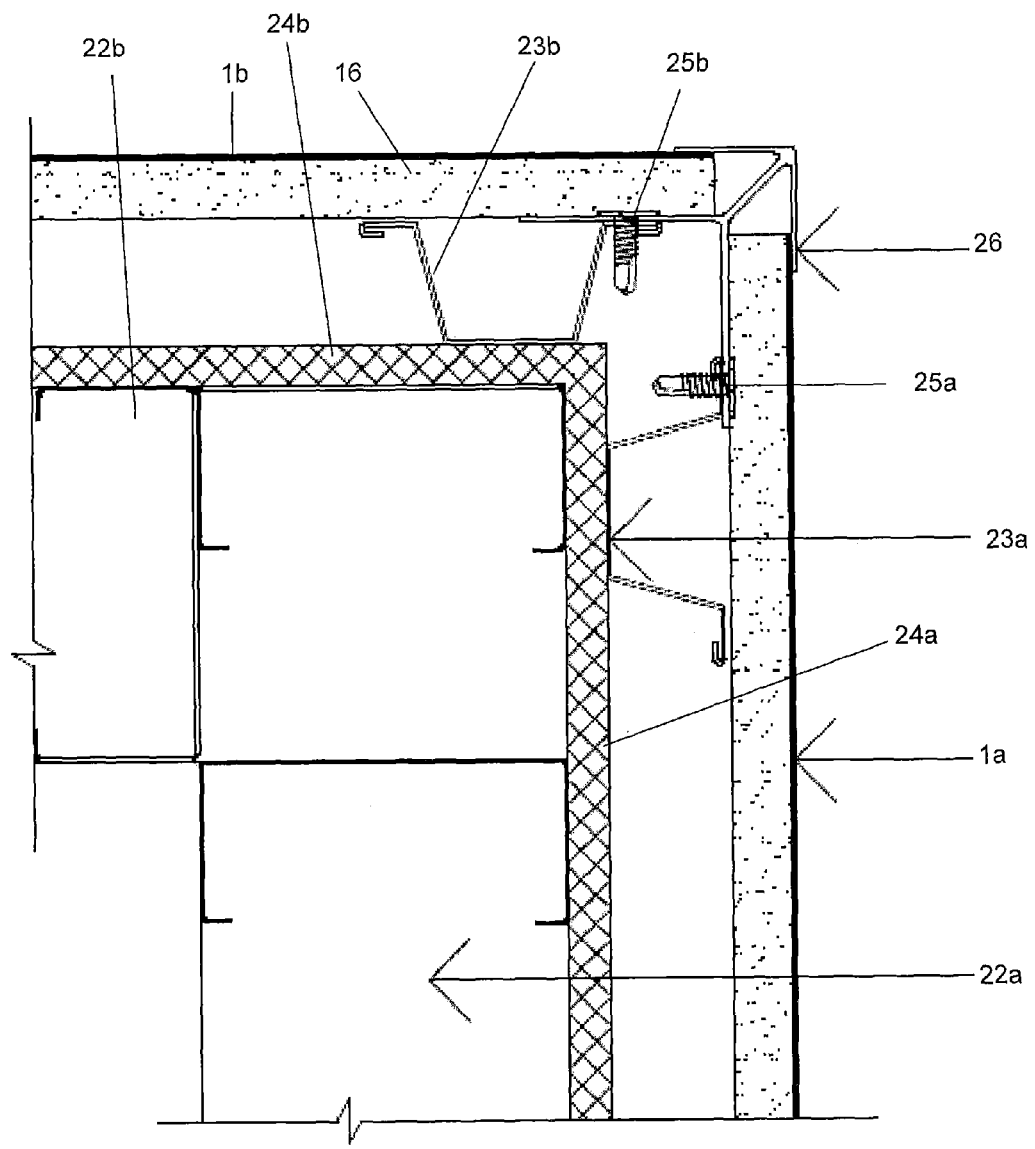
FIG. 7 shows a sectional view of a 90° exterior corner of the building shown in FIG. 3.
Figure 8:
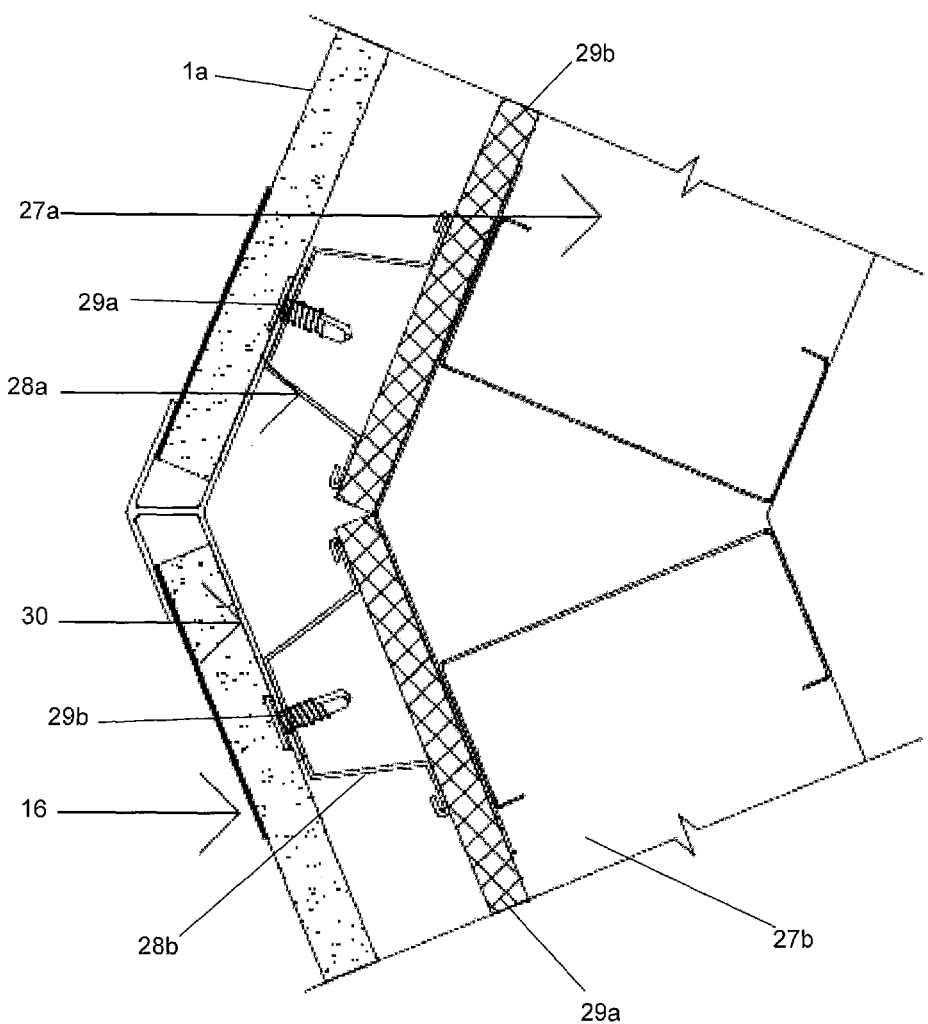
FIG. 8 shows a sectional view of a 135° exterior corner of the building shown in FIG. 3.
Figure 9:
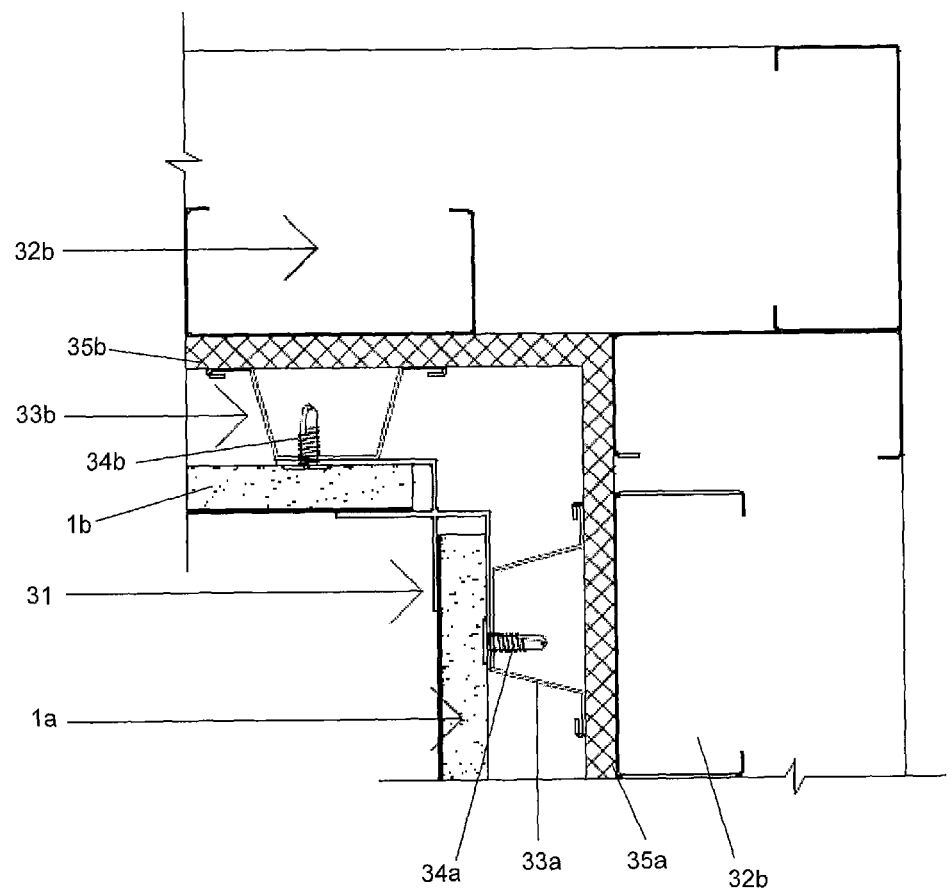
FIG. 9 shows a sectional view of a 90° interior corner of the building shown in FIG. 3.
Figure 10:
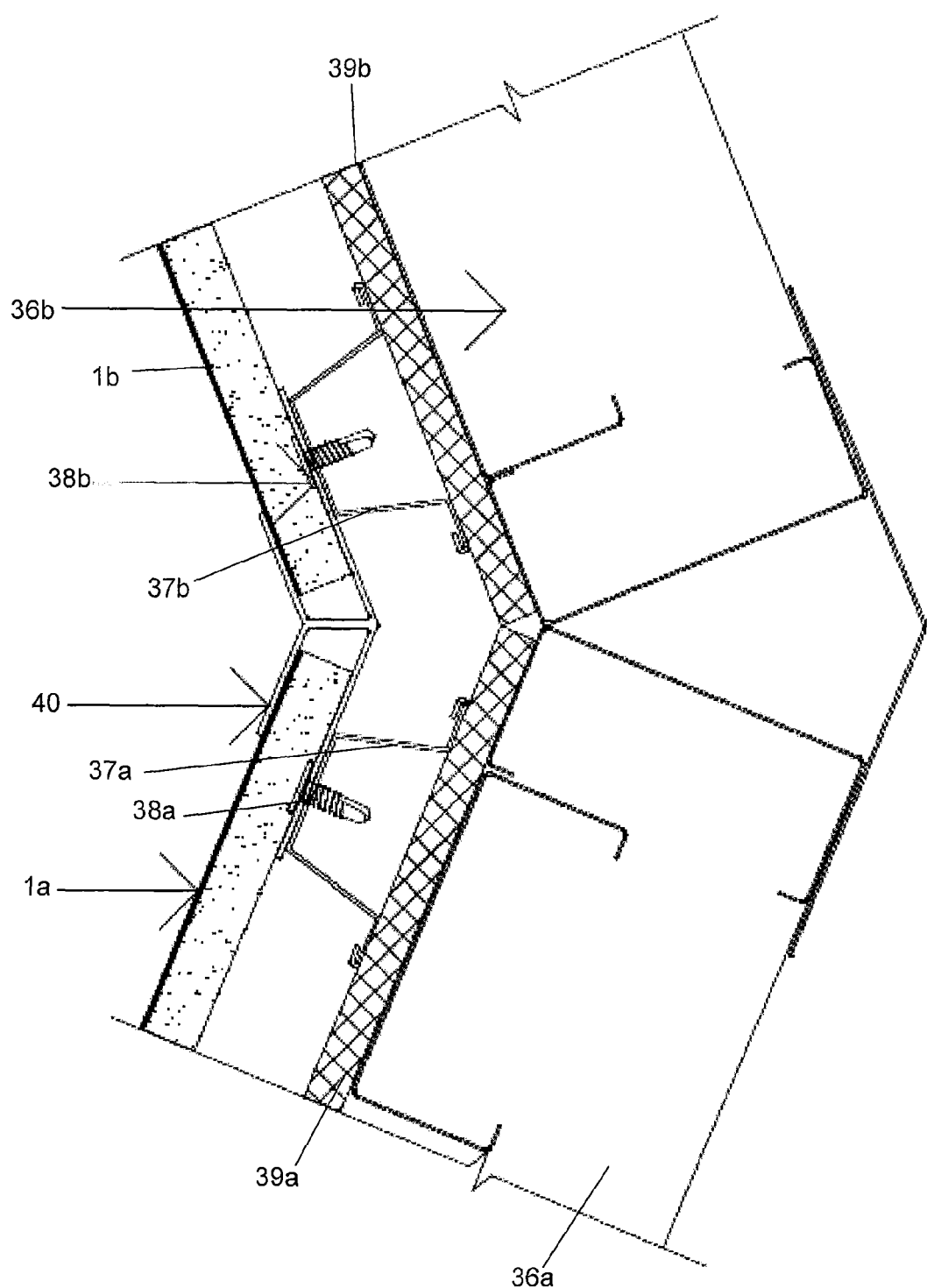
FIG. 10 shows a sectional view of a 135° interior corner of the building shown in FIG. 3.
Figure 11:
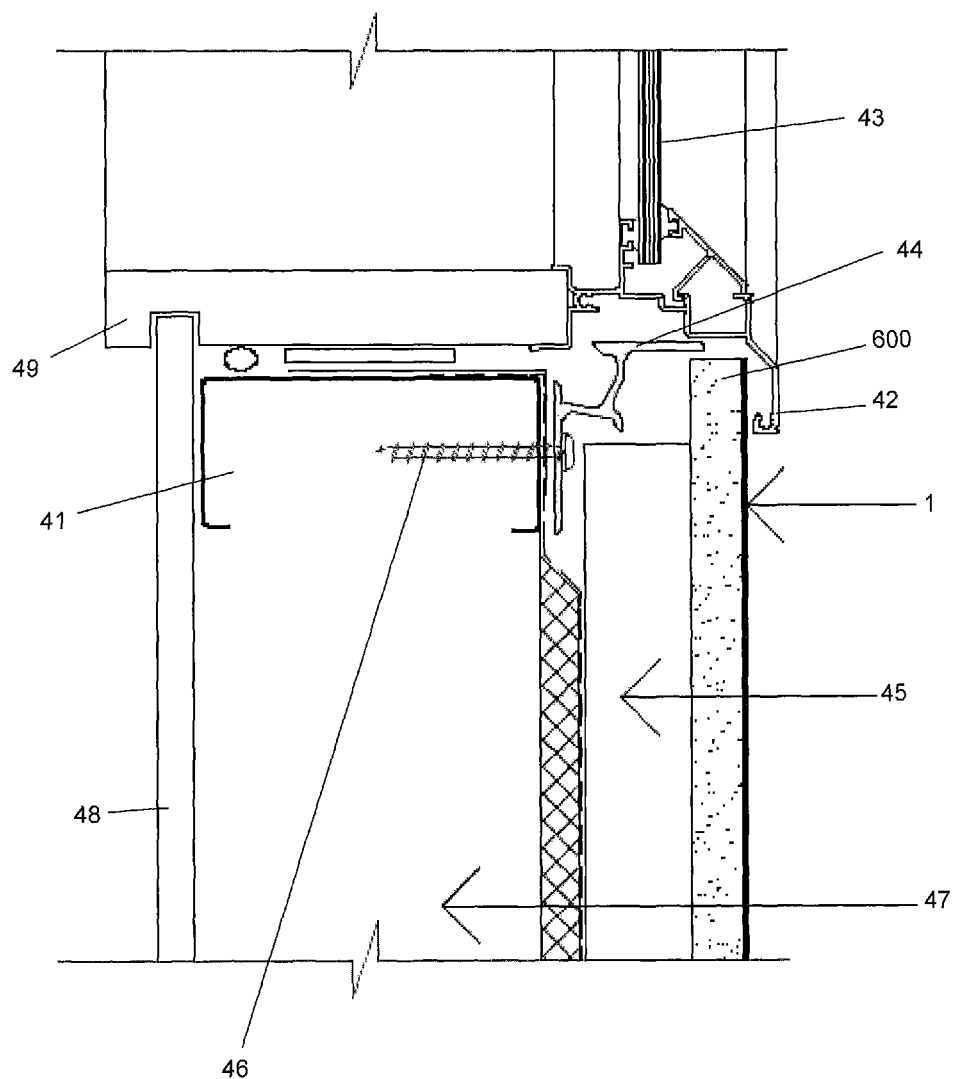
FIG. 11 shows a sectional view of a window sill of the building shown in FIG. 3.
Figure 12:
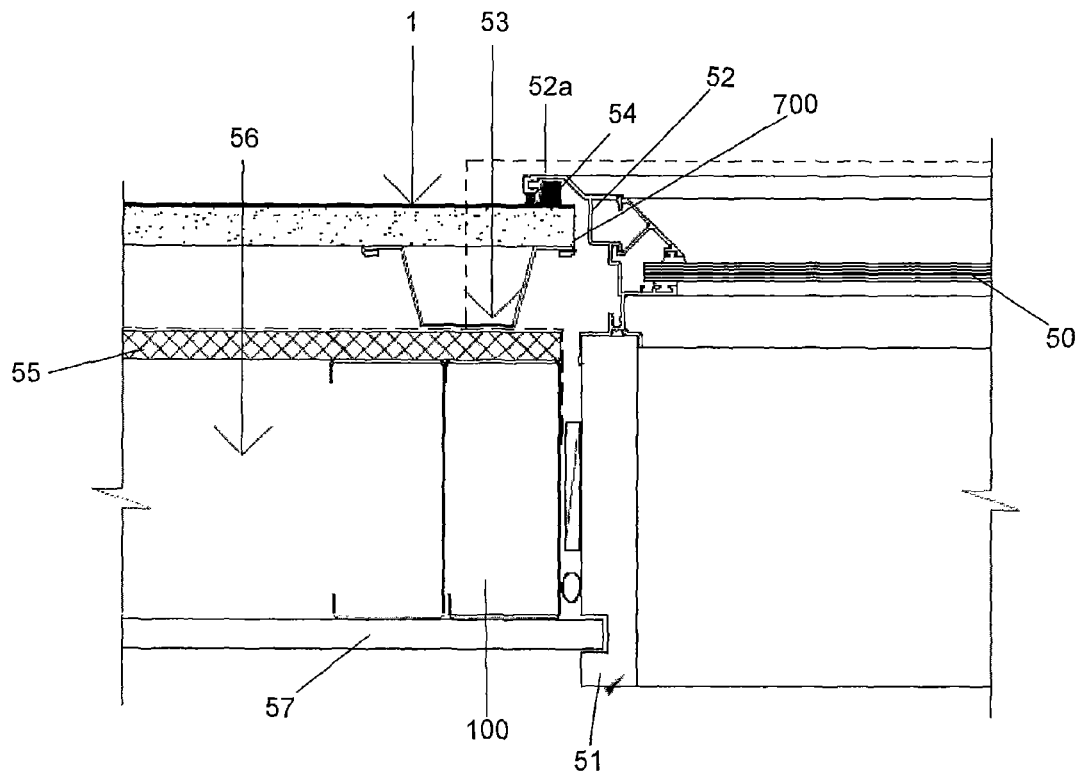
FIG. 12 shows a sectional view of a window jamb of the building shown in FIG. 3.
Figure 13:
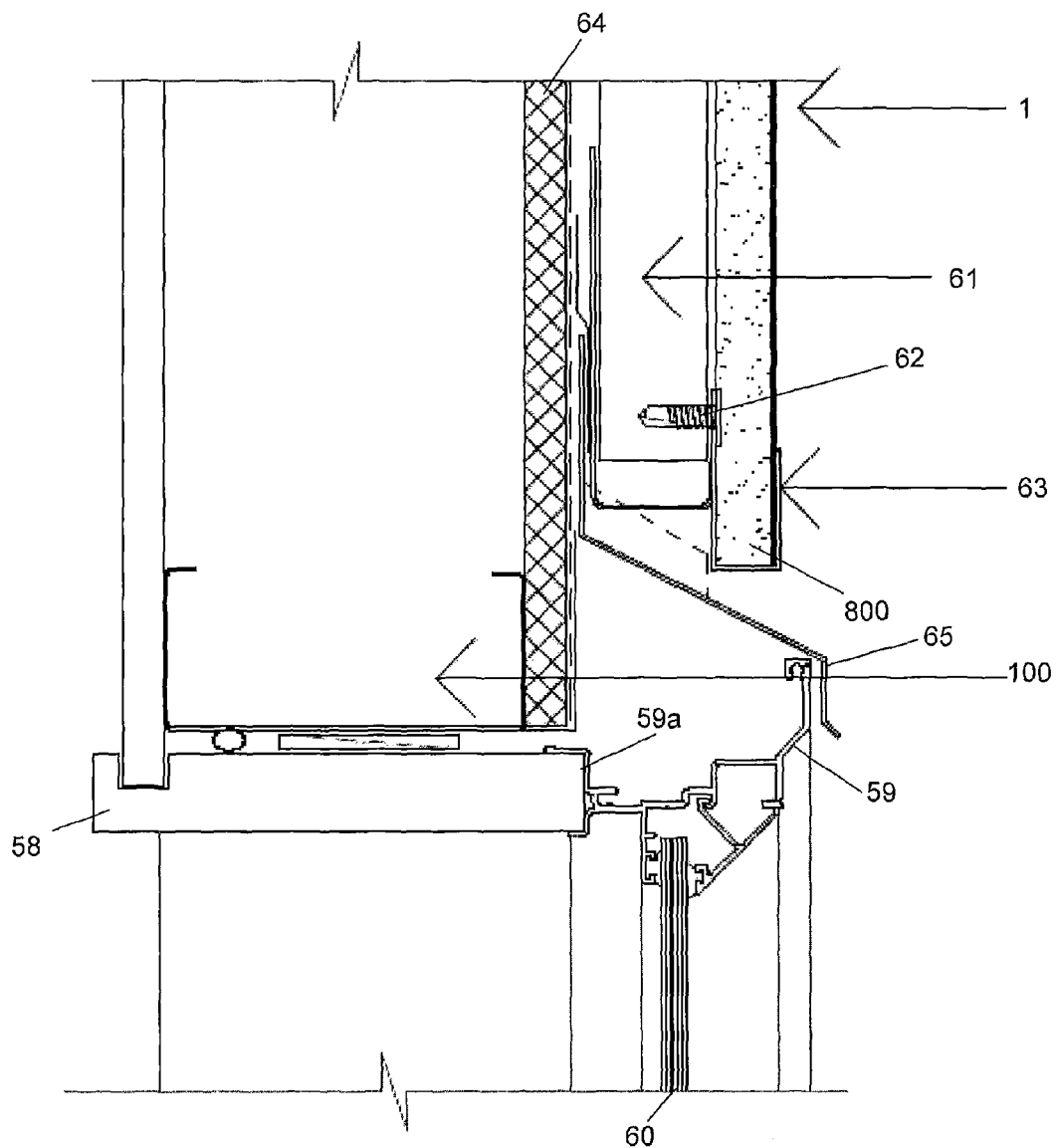
FIG. 13 shows a sectional view of a window head of the building shown in FIG. 3.

Referring to FIG. 3, the panels (1' or 1) are attached to a frame of a building so that they are spaced at regular intervals in the plane of the wall (generally indicated by arrow 100) to form vertical joins (5) or horizontal joins (6) (as shown in FIG. 4). The panels (1' or 1) can be positioned underlying to a soffit (7) (as shown in FIG. 5) of a roof (not shown), to form a base (8) with a floor (as shown in FIG. 6), to form an exterior corner (9) (as shown in FIGS. 7 and 8), to form an interior corner (10) (as shown in FIGS. 9 and 10), to be positioned adjacent a sill (11) of a window (200) (as shown in FIG. 11) and/or a jamb (12) of a window (200) (as shown in FIG. 12) and/or head of a window (13; as shown in FIG. 13).

In use, the panels (1' or 1) are cut to size if needed on site with the use of a cutting tool such as a saw to cut through the aluminium sheets (2) and a Stanley knife to cut the insulating material layer (3).

Referring to FIG. 4, the panels (1' or 1) are attached via screws (14) to a frame (300) of a building by screwing a support extrusion 101 at least partially on, and between, adjacent panels (1' or 1) into a horizontal 30 mm cavity batten 15 (screwed to the building frame 300) from the outside so that they are spaced at regular intervals in the plane of the walls of the building. Elongate flexible flashing (16) and a cap (17) are clipped over the exterior screw heads in the direction of arrow A to hide them and form an aesthetically attractive flushed exterior surface to the wall of the building.

The join formed between adjacent panels (1') is taped over to weather seal the panels (1') on site.

The following description in relation to FIGS. 5 to 13 refers to the use of panel 1. However a person skilled in the art would appreciate that panel 1' could alternatively be used without departing from the scope of the present invention.

Attachment of Composite Cladding Panel to Building Soffit

Referring to FIG. 5, where a panel (1) is positioned below and perpendicular to the plane of a soffit (7) of a roof (not shown) via a top cap extrusion (18) and which is secured to a 30 mm top cavity batten (400) by a screw (500). The batten (400) is in turn secured to a building frame (300).

Attachment of Composite Cladding Panel to Building Base

Referring to FIG. 6, a panel (1) is secured in relation to a building frame base (8) via a base cap extrusion (19) configured to locate the panel (1) in a position perpendicular to the plane of the base (8) via fixing of the base cap extrusion (19) to a batten (20) via a screw (21).

Attachment of Composite Cladding Panel to an Exterior Corner of a Building

Referring to FIG. 7, two adjacent panels (1a and 1b) are positioned on two perpendicular wall frame members (22a and 22b respectively) via cavity support battens (23a and 23b respectively) and fixed via screws (25a and 25b respectively). The cavity support battens (23a and 23b) abut exterior boarding (24a and 24b respectively). The gap formed between the adjacent panels (1a and 1b) at an exterior 90° corner of the building is covered via an exterior 90° corner jointer strip (26) which is attached to the building via the screws (25a and 25b). In this way, the exterior corner strip (26) overlaps the exterior edge of the panels (1a and 1b) to seal the gap formed between them from the ingress of water behind the panels (1a, 1b) without the need for silicone (which can break down after a period of time and need replacing).

Referring to FIG. 8, two adjacent panels (1a and 1b) are positioned on two adjacent wall frame members (27a and 27b respectively) via fixing to cavity support battens (28a and 28b) via screws (29a and 29b respectively). The cavity support battens (28a and 28b) abut exterior boarding (29a and 29b). The gap formed between the adjacent panels (1a and 1b) is covered via an exterior 135° cover jointer (30) in a similar way as described in relation to FIG. 7.

Attachment of Composite Cladding Panel to an Interior Corner of a Building

Referring to FIG. 9 an interior 90° corner jointer strip (31) positions adjacent panels (1a and 1b) in relation to perpendicular wall frame members (32a and 32b respectively) via fixing to 30 mm cavity battens (33a and 33b respectively) via screws (34a and 34b respectively). The cavity battens (33a and 33b) abut exterior board (35a and 35b respectively). The interior corner jointer (31) is attached to the cavity battens (33a and 33b) via the screws (34a and 34b respectively). In this way, the interior 90° corner jointer (31) overlaps the exterior edge of the panels (1a and 1b) to seal the gap formed between them from the ingress of water behind the panels (1a, 1b) without the need for silicone.

Referring to FIG. 10, the adjacent panels (1a and 1b) are positioned on two wall frame members (36a and 36b respectively) via fixing to cavity support battens (37a and 37b) via screws (38a and 38b respectively). The cavity support battens abut exterior boards (39a and 39b respectively). An interior 135° corner jointer (40) covers the gap formed between the adjacent panels (1a and 1b) and is fixed in the same way as described in relation to FIG. 9.

Attachment of Composite Cladding Panel to a Window Sill of a Building

Referring to FIG. 11, a top edge (600) of a composite cladding panel 1 is located and positioned relative to window sill (41), window frame (42) and window (43) via extrusion (44). The interior side surface of the panel (1) is supported via a 30 mm cavity batten (45). The extrusion (44) is supported on the window sill (41) via screws (46). The extrusion (44) also provides a barrier to the ingress of water between the window frame (42) and window sill (41).

The window sill (41) is positioned relative to a building frame (47) via support 48. In turn, the window frame (42) is positioned relative to the window sill (41) via support 49.

Attachment of Composite Cladding Panel to a Window Jamb of a Building

Referring to FIG. 12, a side edge (700) of a composite cladding panel (1) is located and positioned relative to a window (50), window jamb (51) and aluminium frame (52) via fixing to a 30 mm cavity batten (53) via screws (not shown). The edge of the panel (1) adjacent the window frame (52) is positioned via frame lip (52a) and seal (54).

The batten (53) is supported on wall board (55). The window jamb (51) is located relative to a building frame (56) via support (57).

Attachment of Composite Cladding Panel to a Window Head

Referring to FIG. 13, a panel (1) is positioned relative to a window head (58), window frame (59) and window (60) via fixing to a 30 mm cavity batten (61) via screw (62). In addition, the bottom edge (800) of the panel (1) is located via capping mould (63) which is fixed to the cavity batten (61) via the screw (62). The window frame (59) is supported on the window head (58) via channel (59a). The gap between the window frame (59) and wall board (64) on which the cavity batten (61) abuts is weather sealed with a flashing (65).

The above description in relation to FIG. 12 (window jamb) and FIG. 13 (window head) also applies to a door jamb or door head.

Advantages

The present invention offers notable advantages over the prior art including:

Improved ease of use in constructing a building;
Improved maintenance of building constructed with the building system of the present invention; and
Improved aesthetic appearance having no screw threads visible on an exterior surface.

Alternatives

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Aspects of the present invention have been described by way of example only and it should be appreciated that modifications and additions may be made thereto without departing from the scope thereof as defined in the appended claims.

What we claim is:

1. A cladding panel building system comprising:
a cavity batten which in use is secured to a building frame;
a cladding panel including:
an exterior layer made of a waterproof material; and
an interior layer made of an insulating material; and
at least one support extrusion configured to fix adjacent panels to the cavity batten via at least one fixing element;
wherein said cavity batten provides a cavity, between said cladding panel, and said building frame.

2. The cladding panel building system as claimed in claim 1 wherein the interior layer is made from closed cell foam.

3. The cladding panel building system as claimed in claim 2 wherein the closed cell foam is extruded polystyrene foam.

4. The cladding panel building system as claimed in claim 1 wherein the exterior layer is metal sheet.

5. The cladding panel building system as claimed in claim 4 wherein the metal sheet is aluminum.

6. The cladding panel building system as claimed in claim 1 wherein the exterior layer is in the range 1 mm to 4 mm in thickness.

7. The cladding panel building system as claimed in claim 6 wherein the exterior layer is 3 mm in thickness.

8. The cladding panel building system as claimed in claim 1 wherein the exterior layer is fixed to the interior layer via double sided tape.

9. A composite cladding panel building system as claimed in claim 1 wherein the corner joint is selected from the group consisting of: a 90° interior corner joint; a 135° interior corner joint; a 90° exterior corner joint; and a 135° exterior corner joint.

10. A composite cladding panel building system as claimed in claim 1 wherein the composite cladding panel system also comprises at least one soffit extrusion configured to locate a top edge of the composite cladding panel relative to a soffit of a building roof.

11. A composite cladding panel building system as claimed in claim 1 wherein the composite cladding panel system also comprises at least one base extrusion configured to locate a bottom edge of the composite cladding panel relative to a base surface of a building.

12. A composite cladding panel building system as claimed in claim 1 wherein the composite cladding panel system also comprises at least one sill extrusion configured to locate a top edge of the composite cladding panel relative to a window sill of a building roof.

13. A composite cladding panel building system as claimed in claim 1 wherein, the composite cladding panel system also comprises at least one head extrusion configured to locate a bottom edge of the composite cladding panel relative to a window or door head of a building.

14. A kit of parts for cladding the exterior of a building, the kit of parts comprising:
   at least one cavity batten, which in use, is secured to a building frame;
   at least one cladding panel including:
      an exterior layer made of a waterproof material; and
      an interior layer made of an insulating material;
   at least one support extrusion configured to fix adjacent panels to a cavity batten via at least one fixing element,
   wherein said cavity batten provides a cavity, between said cladding panels, and said building frame.

* * * * *